United States Patent
Höfig et al.

(10) Patent No.: US 10,481,989 B2
(45) Date of Patent: Nov. 19, 2019

(54) METHOD AND APPARATUS FOR GENERATING A FAULT TREE FOR A FAILURE MODE OF A MULTI-MODE SYSTEM

(71) Applicant: Siemens Aktiengesellschaft, München (DE)

(72) Inventors: Kai Höfig, München (DE); Marc Zeller, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 176 days.

(21) Appl. No.: 15/249,685

(22) Filed: Aug. 29, 2016

(65) Prior Publication Data

US 2017/0132054 A1    May 11, 2017

(30) Foreign Application Priority Data

Oct. 2, 2015   (EP) .................................... 15188147

(51) Int. Cl.
*G06F 11/00*      (2006.01)
*G06F 16/22*      (2019.01)
(Continued)

(52) U.S. Cl.
CPC ...... *G06F 11/2257* (2013.01); *G05B 23/0248* (2013.01); *G06F 11/004* (2013.01);
(Continued)

(58) Field of Classification Search
CPC .............. G06F 11/079; G06F 11/0736; G06F 11/0751; G06F 11/2252; G06F 11/2257; G06F 11/004; G06F 17/30327
See application file for complete search history.

(56) References Cited

U.S. PATENT DOCUMENTS

| | | | |
|---|---|---|---|
| 7,516,025 B1 | 4/2009 | Williams et al. | |
| 2009/0083576 A1* | 3/2009 | Vlassova | G06F 17/5009 714/26 |

(Continued)

FOREIGN PATENT DOCUMENTS

EP    2876519 A2    5/2015

OTHER PUBLICATIONS

Adler, R., Dorris, D., Höfig, K., Kemmann, S., Kuhn, T., Schwinn, J. P., & Trapp, M. (Oct. 2010). Integration of component fault trees into the UML. In International Conference on Model Driven Engineering Languages and Systems (pp. 312-327). Springer, Berlin, Heidelberg.*

(Continued)

*Primary Examiner* — Paul Contino
(74) *Attorney, Agent, or Firm* — Schmeiser, Olsen & Watts LLP (57) ABSTRACT

A method and apparatus for generating a fault tree for a failure mode of a multi-mode system which includes a plurality of system components, the method includes the steps of providing component fault tree elements of the system components, wherein each component fault tree element includes at least one component fault tree mode element, representing a failure-relevant operation mode of the respective system component; selecting at least one component fault tree mode element representing a system state of the system; and generating the fault tree by incorporating the selected component fault tree mode elements the generated fault tree representing a failure behaviour of a system state of the system.

11 Claims, 6 Drawing Sheets

(51) Int. Cl.
*G06F 11/07* (2006.01)
*G06F 11/22* (2006.01)
*G05B 23/02* (2006.01)

(52) U.S. Cl.
CPC .......... *G06F 11/008* (2013.01); *G06F 11/079* (2013.01); *G06F 11/0736* (2013.01); *G06F 11/0751* (2013.01); *G06F 11/2252* (2013.01); *G06F 16/2246* (2019.01)

(56) References Cited

U.S. PATENT DOCUMENTS

| | | | | |
|---|---|---|---|---|
| 2009/0106593 | A1* | 4/2009 | Bluvband | G05B 23/0278 714/37 |
| 2012/0096318 | A1* | 4/2012 | Kaiser | G06F 11/0718 714/38.1 |
| 2013/0042167 | A1* | 2/2013 | Xiang | G06Q 10/10 714/786 |
| 2014/0359366 | A1* | 12/2014 | Schwinn | G06N 5/00 714/37 |
| 2015/0142402 | A1* | 5/2015 | Ramesh | G06F 17/5009 703/7 |
| 2018/0356810 | A1* | 12/2018 | Hofig | G05B 23/0248 |
| 2019/0108084 | A1* | 4/2019 | Hipp | G05B 17/02 |
| 2019/0138416 | A1* | 5/2019 | Kaukewitsch | G06F 11/27 |

OTHER PUBLICATIONS

Xiang, J., Yanoo, K., Maeno, Y., & Tadano, K. (Jun. 2011). Automatic synthesis of static fault trees from system models. In Secure Software Integration and Reliability Improvement (SSIRI), 2011 Fifth International Conference on (pp. 127-136). IEEE.*

Saxena, A., & Manglani, T. (2013). Enhancing computer system reliability using fault tree analysis. Int J Recent Res Rev, 6, 12-17.*

Wang, Yanjun. Development of a computer-aided fault tree synthesis methodology for quantitative risk analysis in the chemical process industry. Diss. Texas A&M University, 2005.*

Hoefig, Kai. Component Fault Tree Analysis—Managing complexity with a component Managing complexity with a component-centered analysis approach. 2016. Siemens AG.*

K. Jamboti, M. Roth, R. Brandstädter, and P. Liggesmeyer. Modeling and Analysis of State/Event Fault Trees using ESSaRel . 2013. IARIA.*

Bernhard Kaiser, Peter Liggesmeyer, and Oliver Mäckel "A new component concept for fault trees", in SCS '03: Proceedings of the 8th Australian workshop on safety critical systems and software, pp. 37-46, Darlinghurst, Australia, 2003. Australian Computer Society. Inc.; XP055206337.

Höfig Kai et al: "ALFRED: A Methodology to Enable Component Fault Trees for Layered Architectures"; 41st Euromicro Conference on Software Engineering and Advanced Applications; IEEE; pp: 167-176; XP032798511; DOI: 10.1109/SEAA.2015.26.

European Search Report for Application No. 15188147.1, dated Jan. 29, 2016.

* cited by examiner

METHOD AND APPARATUS FOR GENERATING A FAULT TREE FOR A FAILURE MODE OF A MULTI-MODE SYSTEM

CROSS-REFERENCE TO RELATED APPLICATIONS

This application claims priority to European application No. EP 15188147.1, having a filing date of Oct. 2, 2015, the entire contents of which are hereby incorporated by reference.

FIELD OF TECHNOLOGY

The following relates to a method and apparatus for generating a fault tree for a failure mode of a multi-mode system comprising a plurality of system components.

BACKGROUND

A technical system can comprise a plurality of different system components and/or subsystems. These subsystems can consist of software and/or hardware components. Each component in a subsystem can comprise functional components providing functions which can be activated by other components of the same or by another subsystem. The components of a subsystem can communicate with each other by means of a local communication network. A system, in particular a safety-critical system, can comprise embedded subsystems that communicate with each other and build up a larger loosely coupled system having a complex configuration.

The analysis by means of safety analysis data models of complex systems is in particular important during the development of a complex system. These safety analysis data models are provided for identifying possible drawbacks or insufficiencies of the systems, in particular in terms of system safety. Especially for complex technical systems, a response to a data input or data stimulus can vary depending on the current or momentary state of the respective system. For example, triggering an emergency brake of a transportation system in a stop mode has no effect whereas the effect is dramatically if the transportation system is in high speed operation.

For conventional fault tree analysis, data models exist that aim at a general analysis for a loss of function. Modular or compositional safety analysis methodologies such as component fault trees brake down the complexity of the safety-critical system. In industrial applications, development artefacts such as components or units are often reused from existing artefacts to save development time and development costs. Changes are made to these existing artefacts to match the requirements of the developed complex system. In software development, such a reuse strategy is also known as cone and own. When these development artefacts are reused, their existing safety analysis can form an important input for an early safety assessment of the developed system, since they already provide a valid data model. Complex components of the system that provide more than simple closed loop functionality may have different operational modes that can be active for different situations the complex system is in. In this case, the complexity of the system is not only expressed in the various number of components and their dependencies, but also in the modes the individual states the components are in for a specific situation of the complex system.

SUMMARY

An aspect relates to providing a method and apparatus for failure mode analysis of a complex multi-mode system.

A further aspect achieved according to a first aspect by a method for generating a fault tree of a multi-mode system comprising a plurality of system components comprising the features of claim 1.

Embodiments of the invention provided according to the first aspect method for generating a fault tree for a failure mode of a multi-mode system comprising a plurality of system components, said method comprising the steps of:
providing component fault tree elements of the system components,
wherein each component fault tree element comprises at least one component fault tree mode element representing a failure-relevant operation mode of the respective system component, selecting at least one component fault tree mode element representing a system state of the system and generating the fault tree by incorporating the selected component fault tree mode elements,
wherein said generated fault tree represents a failure behaviour of a system state of the respective system.

The generated fault tree can be evaluated or processed during runtime of the complex technical system or separately in an analysing procedure to investigate and/or to certify the respective complex technical system. The method provides a reliable and fast security check of a complex technical multi-mode system in particular a security check of a modular multi-mode system built up from existing modular components which have a partially amended operational functionality within the complex multi-mode system and which comprise different operation modes.

In a possible embodiment of the method according to the first aspect of the present invention, the generated fault tree is reduced by applying a Boolean logic to create a reduced fault tree for a selected output failure mode of the fault tree.

In a further possible embodiment of the method according to the first aspect of the present invention, the method is performed in a normal operation mode of the system during runtime.

In a still further possible embodiment of the method according to the first aspect of the present invention, the method is performed in a separate operation mode of the system, in particular during deployment of components, during configuration or reconfiguration of the system and/or during maintenance or repair of the system.

In a still further possible embodiment of the method according to the first aspect of the present invention, the failure-relevant operation mode of the system comprises:
a start-up operation mode,
a calibration operation mode,
a degraded operation mode and/or
an emergency operation mode.

In a further possible embodiment of the method according to the first aspect of the present invention, the system components comprise hardware components and/or software components.

In a further possible embodiment of the method according to the first aspect of the present invention, the component fault tree elements and the component fault tree mode elements of the system components are loaded from a library stored in a database.

In a further possible embodiment of the method according to the first aspect of the present invention, the reduced fault tree is evaluated to quantify and/or qualify the failure behaviour of the respective system state.

Embodiments of the invention further provided according to a second aspect an apparatus for generating a fault tree for a failure mode of a multi-mode system.

Embodiments of the invention provided according to the second aspect an apparatus for generating a fault tree for a failure mode of a multi-mode system, said apparatus comprising an input interface adapted to input component fault tree elements of system components, each component fault tree element comprising at least one component fault tree mode element representing a failure-relevant operation mode of the respective system component, a selection unit adapted to select at least one component fault tree mode element representing a system state of the system and a calculation unit adapted to generate the fault tree by incorporating the selected component fault tree mode elements, wherein the generated fault tree represents a failure behaviour of a system state of said system.

In a further possible embodiment of the apparatus according to the second aspect of the present invention, the calculation unit is adapted to reduce by application of a Boolean logic the generated fault tree to provide a reduced fault tree.

In a further possible embodiment of the apparatus according to the second aspect of the present invention, the calculation unit is adapted to evaluate the reduced fault tree to provide a quantification and/or qualification result of the failure behaviour of the respective system state of the system.

In a further possible embodiment of the apparatus according to the second aspect of the present invention, the system components comprise hardware components and/or software components of a safety-critical system.

In a further possible embodiment of the apparatus according to the second aspect of the present invention, the component fault tree elements and the component fault tree mode elements of the system components are loaded from a library stored in a database.

In a further possible embodiment of the apparatus according to the second aspect of the present invention, the apparatus is connectable to at least one component of the system by means of a communication interface of the apparatus.

The invention further provides according to a third aspect a complex technical system.

The invention provides according to the third aspect a complex technical system comprising a plurality of hardware components and/or software components, said complex technical system having at least one component having a communication interface configured to connect an apparatus for generating a fault tree for a failure mode of the complex multi-mode technical system and configured to evaluate the generated fault tree for a failure mode of the complex technical system, wherein the apparatus comprises an input interface adapted to input component fault tree elements of system components of the complex technical system, each component fault tree element comprising at least one component fault tree mode element representing a failure-relevant operation mode of the respective system component, a selection unit adapted to select at least one component fault tree mode element representing a system state of said complex technical system and a calculation unit adapted to generate the fault tree by incorporating the selected component fault tree mode elements, wherein the generated fault tree represents a failure behaviour of a system state of the complex technical system.

In a possible embodiment of the complex technical system according to the third aspect of the present invention, the calculation unit of the apparatus connected to at least one component via a communication interface is adapted to reduce by application of a Boolean logic the generated fault tree to provide a reduced fault tree and to evaluate the reduced fault tree to provide a quantification and/or qualification result of the failure behaviour of the respective system state of said complex technical system.

In a further possible embodiment of the complex technical system according to the third aspect of the present invention, the fault tree is generated in a separate operation mode of the complex technical system, in particular during deployment of components, during configuration or reconfiguration of the complex technical system and/or during maintenance or repair of the complex technical system.

In a possible embodiment of the complex technical system according to the third aspect of the present invention, the failure-relevant operation mode of the complex technical system comprises a start-up operation mode, a calibration operation mode, a degraded operation mode and/or an emergency operation mode of the complex technical system.

In a further possible embodiment of the complex technical system according to the third aspect of the present invention, the reduced fault tree calculated by the calculation unit is evaluated by the calculation unit to quantify and/or qualify failure behaviour of a respective system state of the complex technical system.

In a further possible embodiment of the complex technical system according to the third aspect of the present invention, the component fault tree elements and the component fault tree mode elements of the system components of the complex technical system are loaded from a library stored in a database connected to the complex technical system via a data bus.

BRIEF DESCRIPTION

Some of the embodiments will be described in detail, with reference to the following figures, wherein like designations denote like members, wherein.

DETAILED DESCRIPTION

Figure 1:
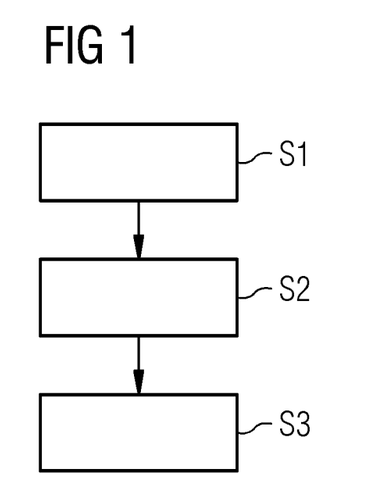
FIG. 1 shows a flowchart of a possible exemplary embodiment of a method for generating a fault tree for a failure mode of a multi-mode system.

As can be seen in FIG. 1, a method for generating a fault tree for a failure mode of a multi-mode system comprising a plurality of system components according to embodiments of the first aspect of the present invention can comprise several steps.

Figure 10:
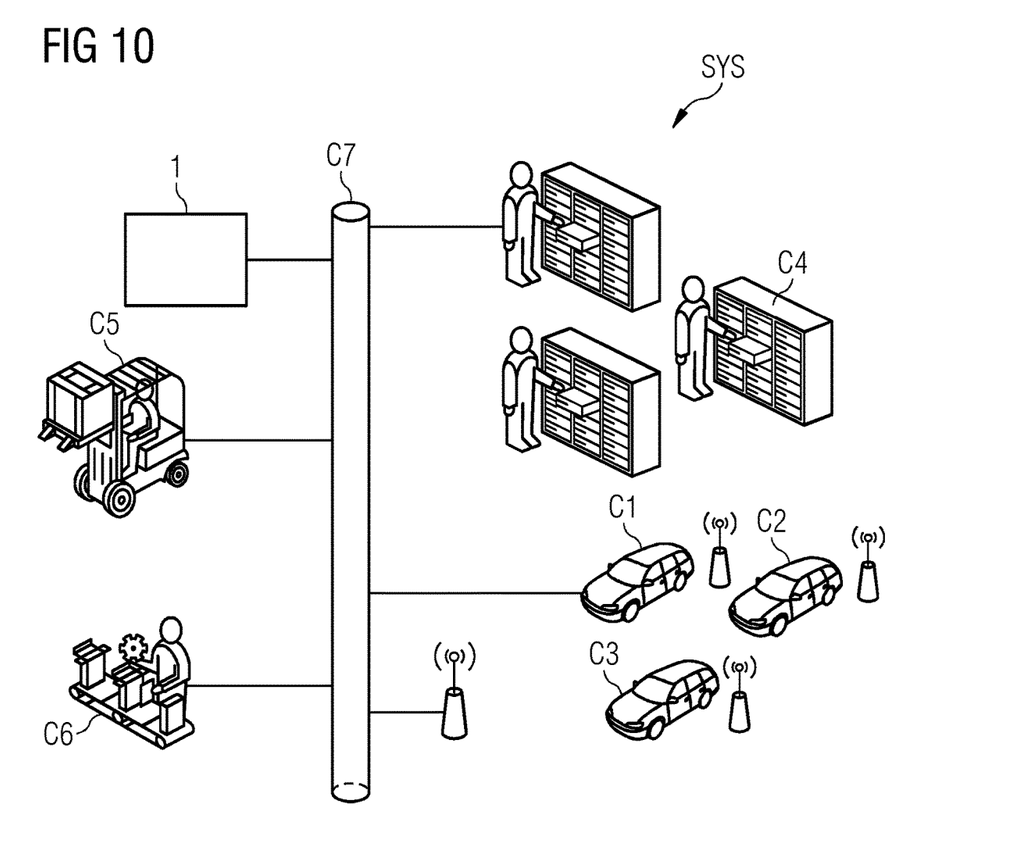
FIG. 10 shows an exemplary complex system investigated by a method or apparatus.
Figure 11:
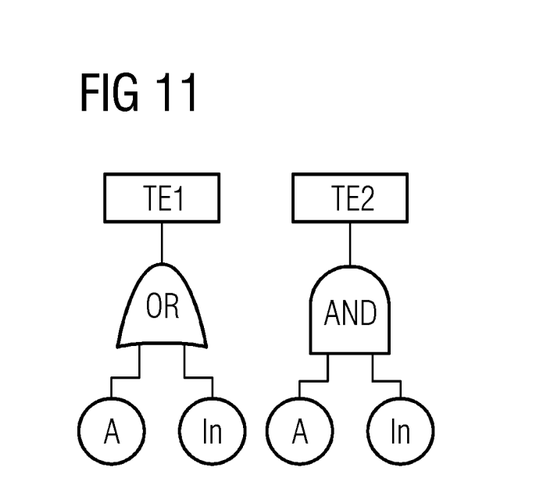
FIG. 11 shows a conventional fault tree.
Figure 12:
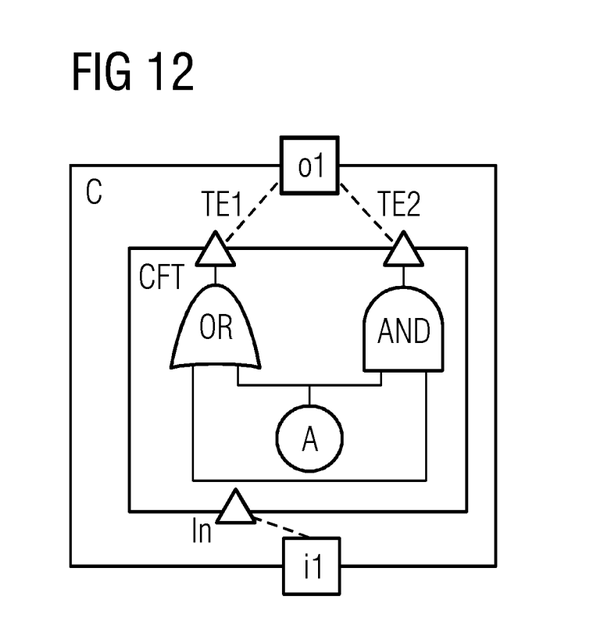
FIG. 12 shows a component fault tree as used by the method and apparatus.

The complex technical system can be a safety-critical system SCS, in particular a cyberphysical complex system SYS as illustrated in FIG. 10. The components c such as the components C1 to C7 illustrated in FIG. 10 can comprise hardware and/or software components. Each component c can be represented by a corresponding component fault tree element CFTE. The functional safety behaviour of each component c of the system SYS can be represented by an associated component fault tree element. The component fault tree element CFTE is a Boolean data model associated with system development elements such as components c. Each different component fault tree element CFTE can be related to each component c of the complex technical system SYS. Failures that are visible at the outport of a component are modelled using output failure modes, OFMs, which are related to the specific outport of the component c. For modelling how specific failures propagate from an inport of a component to an outport, input failure modes, IFMs, are used. The inner failure behaviour within the component c that also influences the output failure modes, OFMs, is modelled in a preferred embodiment using gates such as NOT, AND, OR gates, and basic events. FIG. 11 shows a conventional classic fault tree and FIG. 12 shows a corresponding component fault tree CFT. In both trees, the top events or output events TE1 and TE2 can be modelled. The component fault tree model illustrated in FIG. 12 allows, additionally to the Boolean formulae that are also modelled within the conventional classic fault tree illustrated in FIG. 11, to associate the specific top events TE to the corresponding ports where these failures can appear. Top event TE1, for example, appears at port O1. Input Failure Mode In is associated with import i1 of the component c. The inner failure behaviour is modelled by basic event A as input to an OR gate and an AND gate. Using this methodology of components also within fault tree models, benefits during the development of the complex system SYS can be observed, for example an increased maintainability of the safety analysis model. A complex technical system SYS comprises a plurality of software and/or hardware components c. In a possible embodiment, the complex technical system SYS comprises at least one component c having a communication interface configured to connect an apparatus adapted to generate a fault tree for a failure mode of the multi-mode complex system SYS and to evaluate the generated fault tree.

With the method for generating a fault tree for a failure mode of the multi-mode system as illustrated in FIG. 1, in a first step S1, component fault tree elements of the system components c are provided. For example in FIG. 3, three component fault tree elements CFTE1, CFTE2, CFTE3 of three corresponding components are shown. Each component fault tree element CFTE1, CFTE2, CFTE3 comprises at least one component fault tree mode element representing a failure-relevant operation mode of the respective system component c. In the exemplary system data model SYS-DM illustrated in FIG. 3, the second component fault tree element CFTE2 has two component fault tree mode elements $CFTME_A$, $CFTME_B$ representing two different operation modes of the respective system component. The first and third component fault tree elements CFTE1, CFTE3 represent corresponding components operating in a single operation mode so that the component fault tree element CFTE1 is identical with it component fault tree mode element CFTME1 and the component fault tree element CFTE3 is identical with the component fault tree mode element CFTME3.

In a further step S2, at least one component fault tree mode element CFTME representing a system state of the system is selected.

In a further step S3, the fault tree is generated by incorporating the selected component fault tree mode elements CFTMEs, wherein the generated fault tree represents a failure behaviour of a system state of the respective technical system.

In a possible embodiment, the generated fault tree is reduced by applying a Boolean logic to create a reduced fault tree for a selected output failure mode of the fault tree.

In a possible embodiment, the method as illustrated in FIG. 1, can be performed in a normal operation mode of the system during runtime. In an alternative embodiment, the method can be performed in a separate operation mode of the investigated technical system, in particular during deployment of components, during configuration or reconfiguration of a component of the system and/or during maintenance or repair of a component of the system. The failure-relevant operation modes of the system SYS can comprise a start-up operation mode, a calibration operation mode, a degraded operation mode and/or an emergency operation mode of the technical system SYS. In a possible embodiment of the method as illustrated in FIG. 1, the component fault tree elements and the component fault tree mode elements of the system components c are loaded from a library stored in a database. In a further possible embodiment, the reduced fault tree is further evaluated to quantify and/or qualify the failure behaviour of the respective system state of the system SYS.

Figure 2:
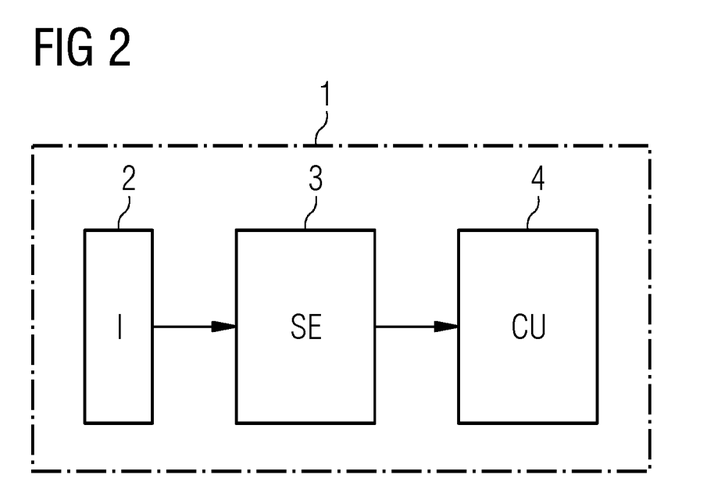
FIG. 2 shows a block diagram of a possible exemplary embodiment of an apparatus for generating a fault tree for a failure mode of a multi-mode system.

FIG. 2 illustrates a block diagram of a possible exemplary embodiment of an apparatus 1 for generating a fault tree for a failure mode of a multi-mode system. The apparatus 1 comprises in the shown embodiment an input interface 2 adapted to input component fault tree elements of system components c, wherein each component fault tree element comprises at least one component fault tree mode element representing a failure-relevant operation mode OM of the respective system component c. In a possible embodiment, the input interface 1 is connected to a database. In this embodiment, the component fault tree elements and the component fault tree mode elements of the system components c of the system SYS are loaded from a library stored in a database. The apparatus 1 can be further connectable to at least one component c of the system SYS itself by means of an additional communication interface.

The apparatus 1 further comprises a selection unit 3 adapted to select at least one component fault tree mode element representing a system state of the investigated technical system SYS. The apparatus 1 further comprises a calculation or processing unit 4 adapted to generate the fault tree by incorporating the selected component fault tree mode elements. The generated fault tree represents a failure behaviour of a system state of the investigated system SYS. In a possible embodiment, the calculation unit 4 of the apparatus 1 is further adapted to reduce by application of a Boolean logic the generated fault tree to provide a reduced fault tree. In a further possible embodiment, the calculation unit 4 of the apparatus 1 is adapted to evaluate the reduced fault tree to provide a quantification and/or a qualification result of the failure behaviour of the respective system state of the investigated system SYS.

In a possible embodiment, the apparatus 1 can be connected to an investigated system SYS during its normal operation mode and the analysis can be performed in the normal operation mode of the system SYS during runtime of the system SYS.

In an alternative embodiment, the connected apparatus 1 is configured to generate the fault tree for a failure mode of the investigated multi-mode system SYS in a separate operation mode of the investigated system SYS. For instance, the apparatus 1 can generate and analyse the fault tree in a possible embodiment during deployment of specific components c of the system SYS, during configuration or reconfiguration of one or several system components c of the system SYS or during maintenance or repair of one or more system components c of the system SYS. In a possible embodiment, the apparatus 1 as shown in FIG. 2 is activated during a failure-relevant operation mode of a specific system component c of the investigated system SYS. This failure-relevant operation mode of the system SYS or system component c can comprise a start-up operation mode, a calibration operation mode, a degraded operation mode and/or an emergency operation mode of a specific component c and/or the whole system SYS.

In a possible embodiment, the apparatus 1 as shown in FIG. 2 forms a separate device which can be connected to at least one component c of the system SYS by means of a communication interface. In a possible embodiment, the input interface 2 of the apparatus 1 is connected to a corresponding interface of a system component c.

In a still further possible embodiment, the apparatus 1 as shown in FIG. 2 can be integrated in the complex technical system SYS, for instance in a complex technical embedded system. In this embodiment, the input interface 2 of the apparatus 1 can be connected to a system bus of the respective complex technical system SYS.

Figure 3:
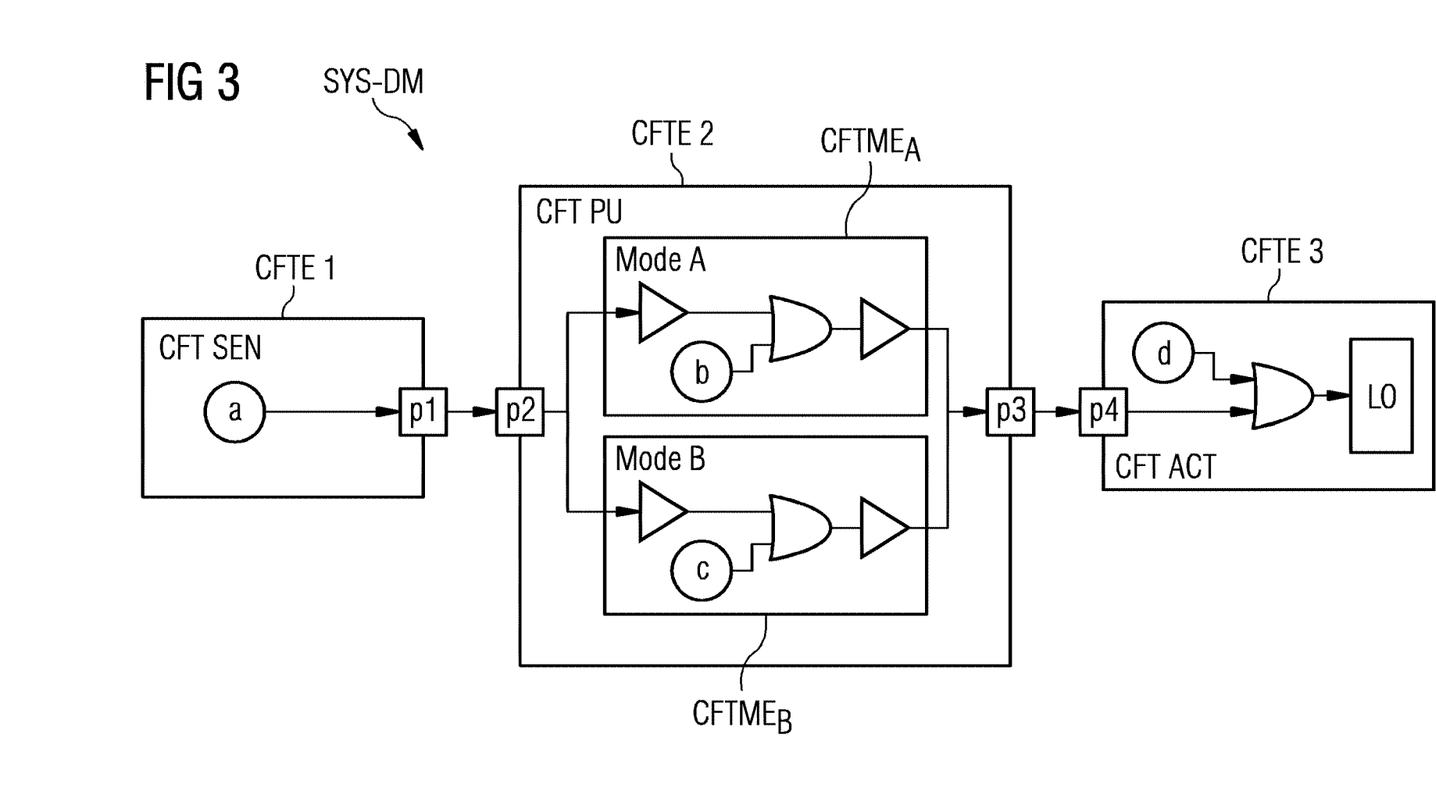
FIG. 3 shows a component fault tree data model of components of an exemplary complex system for illustrating the operation of a method and apparatus.

FIG. 3 shows a component fault tree data model SYS-DM of a system SYS comprising three system components, wherein one component can operate in two different operation modes, i.e. mode A and mode B. In the illustrated exemplary data model of FIG. 3, the complex system SYS comprises a sensor SEN, a processing unit PU and an actor ACT. The component fault tree data model SYS-DM shown in FIG. 3 comprises a corresponding number of component fault tree elements CFTE1, CFTE2, CFTE3 for each system component c of the investigated exemplary system. In internal failure propagation behaviour of the component c is modelled by gates such as OR Gates and basic events a, b, c, d. The output of the third component actor ACT is associated to the top event "loss of" LO as illustrated in FIG. 3. Also in FIGS. 4 to 9 LO represents the top event "loss of".

Figure 4:
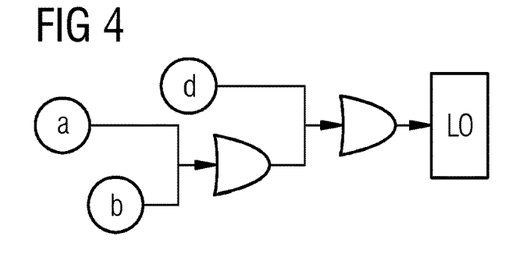
FIG. 4 shows a diagram for illustrating a generated fault tree for a system state in an operation mode of a system component of a complex system represented by the component fault tree model as shown in FIG. 3.
Figure 5:
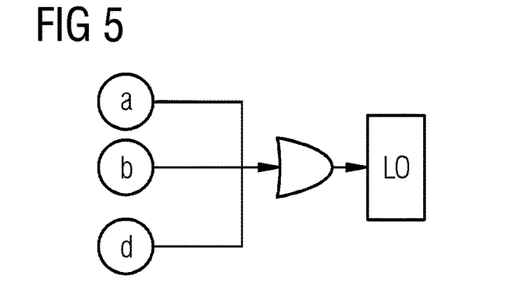
FIG. 5 shows a diagram of a reduced fault tree derived from the generated fault tree illustrated in FIG. 4.

In the shown example, a component fault tree element of the second system component "processing unit" PU comprises two component fault tree mode elements $CFTME_A$, $CFTME_B$ each representing a failure-relevant operation mode of the system component "processing unit". These component fault tree mode elements $CFTME_A$, $CFTME_B$ model the failure behaviour of the component "processing unit" PU for two different modes A, B. If the component c "processing unit" PU of the system SYS operates in mode A, a failure of type b will result in a failure at the outport P3 of the component. In contrast, if the component "processing unit" PU operates in operation mode B, a failure of type b cannot occur, but a failure of type c will result in a failure visible at the outport P3 of the component "processing unit" PU. Accordingly, if the system SYS operates in a state where the component "processing unit" PU operates in mode A, the failure behaviour of the system SYS can be described by a fault tree as depicted in FIG. 4. By application of a Boolean logic, a reduced fault tree for this mode A can be generated as shown in FIG. 5.

Figure 6:
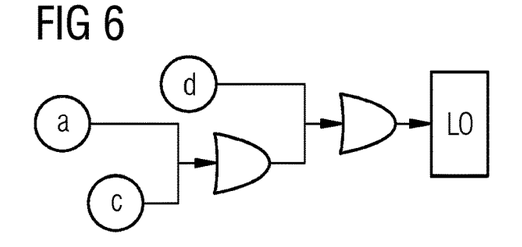
FIG. 6 shows a diagram for a generated fault tree for a system state of a complex system where a specific component is in a second operation mode.
Figure 7:
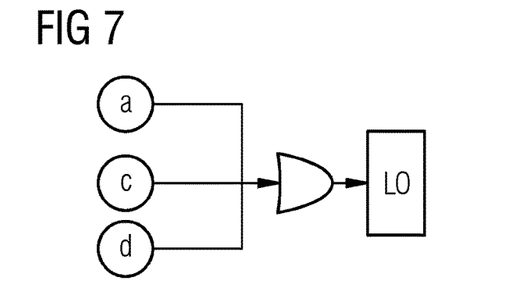
FIG. 7 shows a diagram of a reduced fault tree derived from the generated fault tree shown in FIG. 6.

If the system SYS operates in a state where the component "processing unit" PU operates in mode B, a failure behaviour of the system SYS can be described by a fault tree as depicted in FIG. 6. This generated fault tree can be reduced by application of a Boolean logic through a reduced fault tree as shown in FIG. 7.

Figure 8:
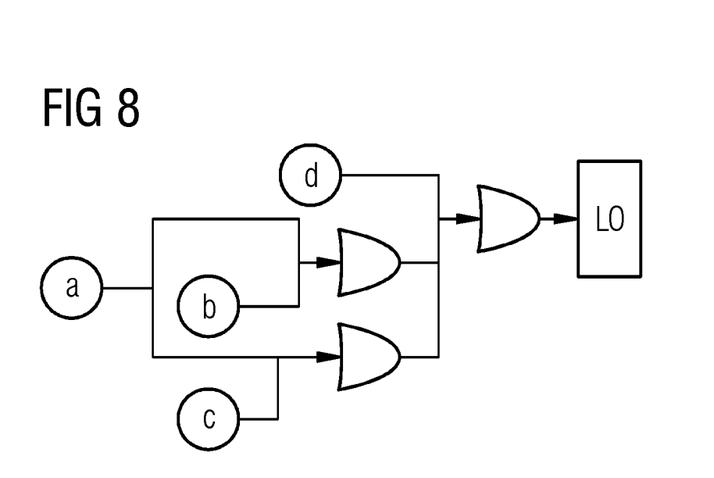
FIG. 8 shows a diagram for a system state of a complex system where both modes of a specific component of the system are active.
Figure 9:
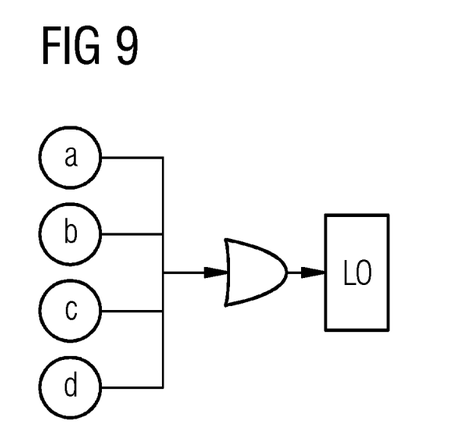
FIG. 9 shows a diagram for illustrating a reduced fault tree derived from the fault tree illustrated in FIG. 8.

If it is unclear in which state the technical system SYS is currently operating, a worst case can be assumed. As a result, both modes may be active and the failure behaviour of the investigated technical system SYS can be expressed by using a fault tree as depicted in FIG. 8. This generated fault tree can be reduced by application of a Boolean logic to provide a reduced fault tree as shown in FIG. 9.

With the method according to the first aspect of embodiments of the present invention, it is possible to divide safety analysis models into different states or modes of a component for a State AwaRe fault Tree Analysis (SPARTA) of the respective system SYS. Each component c of the system can have multiple states with different failure behaviour. The reaction of the complex investigated system SYS can be analysed by identifying active states of particular components c of the system in a certain situation.

$C = c_1, \ldots, c_n$ represents the set of components c of an investigated technical system SYS, $CFT = cft_1, \ldots, cft_m \cup \emptyset$ represents the set of component fault trees:

$$C\dot{F}T(c) = cft \text{ with } c \in C \text{ and } cft \in CFT.$$

Further $$IN(c) = in_1, \ldots, in_i, \text{ and } OUT(c) = out_1, \ldots, out_j$$

represents the in- and outports of a component c and $$\overline{CON} = \{(out, in) | out \in OUT(c_1) \cup \ldots OUT(c_n), in \in IN(c_1) \cup \ldots \cup IN(c_n)\}$$

is the set of all possible port connections and $$CON \subseteq \overline{CON}$$

being the set of actual port connections modelling the data flow from the outport of a component to the inport of another component.

Further $$SPARTA(c) = m_1, \ldots, m_n$$

is the set of all modes m of a component c.

For the exemplary system data model SYS-DM of a system SYS shown in FIG. 3, the previously defined sets are as follows:

$$C = \text{sensor, processing, actor} \quad (1)$$

$$IN(\text{sensor}) = \{\} \quad (2)$$

$$IN(\text{processing}) = p_2 \quad (3)$$

$$IN(\text{actor}) = p_4 \quad (4)$$

$$OUT(\text{sensor}) = p_1 \quad (5)$$

$$OUT(processing) = p_3 \quad (6)$$

$$OUT(actor) = \{\ \} \quad (7)$$

$$CONN = (p_1, p_2), (p_3, p_4) \quad (8)$$

$$SPARTA(sensor) = \{\ \} \quad (9)$$

$$SPARTA(processing) = \{1, 2\} \quad (10)$$

$$SPARTA(actor) = = \quad (11)$$

These sets are used for an analysis of a specific state of the system SYS, where each active mode can be addressed. If there is no mode available for a component c, the mode is addressed using *. Also, if all modes of a component c need to be included in the analysis, the symbol * is used.
For the set $C = c_1, \ldots, c_n$, the set $$STATE(C) = \{(m_1, \ldots, m_n) | m_i \in SPARTA(c_i) \cup *, i = 1, \ldots, n\}$$

describes all possible states of the system that are expressed using SPARTA. For the examplary system, this set is as follows:

$$STATE(C) = (*,1,*), (*,2,*), (*,*,*) \quad (12)$$

The method and apparatus can be used to analyse different kinds of technical systems SYS. FIG. 10 shows an exemplary cyberphysical system SYS comprising different subsystems and/or components c1 to c7. All subsystems c can possibly interact with each other, for example via a cable or a wireless connection and can execute a same function on different hardware platforms. If one of these functions migrates to another subsystem, e.g. subsystem C2 uses autonomous driving from subsystem CS, this might require a recertification of the safety analysis model of the different hardware.

Another example for using the method and apparatus according to embodiments of the present invention is the deployment of components, in particular software components, on an existing hardware platform comprising a plurality of different hardware components. For instance, the method and apparatus can be used during deployment of software components in a complex system SYS such as a vehicle or car comprising a plurality of components communicating with each other, for instance via a data or a control bus. A further use case is a safety analysis after two physical subsystems have been coupled with each other. For example, if two train sections are coupled with each other to form a train, the method and apparatus can perform a safety analysis of the created new complex system, i.e. train. For instance, the apparatus 1 according to embodiments of the present invention can be connected to a system bus of the train.

In a possible embodiment, the method is performed in the background during runtime of the investigated complex system SYS. In a possible embodiment, the generated safety analysis results can be output to a user or a central control unit. Depending on the safety analysis results, it can be decided, whether the investigated system SYS is safe or safety-critical. If the safety analysis is performed during the runtime of the safety-critical system SYS, in a possible embodiment, the system may be shut down or deactivated automatically, if the safety analysis performed by the apparatus 1 connected to the complex system SYS or integrated in the complex system SYS indicates that the investigated system SYS cannot be operated safely.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for generating a fault tree for a failure mode of a multi-mode system comprising a plurality of system components, said method comprising the steps of:
   (a) providing component fault tree elements of the system components, wherein
      each component fault tree element includes at least one component fault tree mode element representing a failure-relevant operation mode of the respective system component, and
      at least one component fault tree element comprises a plurality of component fault tree mode elements, wherein each component fault tree mode element of the plurality of component fault tree mode elements of the at least one component fault tree element receives the same output from a previous component fault tree element and each component fault tree mode element results in failure at a single outport;
   (b) selecting at least one component fault tree mode element representing a system state of said system; and
   (c) generating the fault tree by incorporating the at least one selected component fault tree mode element, said generated fault tree representing a failure behaviour of a system state of said system.

2. The method according to claim 1, wherein the generated fault tree is reduced by applying a Boolean logic to create a reduced fault tree for a selected output failure mode of the fault tree.

3. The method according to claim 1, wherein the method is performed in a normal operation mode of said system during runtime.

4. The method according to claim 1, wherein the method is performed in a separate operation mode of said system, during deployment of components, during configuration or reconfiguration of a component of said system and/or during maintenance or repair of a component of said system.

5. The method according to claim 1, wherein the failure-relevant operation mode of the system comprises a start-up operation mode, a calibration operation mode, a degraded operation mode and/or an emergency operation mode.

6. The method according to claim 1, wherein the system components comprise hardware components and/or software components.

7. The method according to claim 1, wherein the component fault tree elements and the component fault tree mode elements of the system components are loaded from a library stored in a database.

8. The method according to claim 2, wherein the reduced fault tree is evaluated to quantify and/or qualify the failure behaviour of the respective system state.

9. The method according to claim 1, wherein each component fault tree mode element of the plurality of component fault tree mode elements of the at least one component fault tree element models an operating mode specific failure behaviour of a component of the system of the components.

10. An apparatus for generating a fault tree for a failure mode of a multi-mode system, the apparatus connected to the multi-mode system and adapted to:
   input a plurality of component fault tree elements of system components of the multi-mode system, wherein each component fault tree element includes at least one component fault tree mode element representing a failure-relevant operation mode of the respective system component, and at least one component fault tree element includes a single inport from a previous component fault tree element and a plurality of component fault tree mode elements that receive the same input through the single inport and result in failure at a single outport of the at least one component fault tree element;

select at least one component fault tree mode element representing a system state of the multi-mode system; and generate the fault tree by incorporating the at least one selected component fault tree mode element wherein the generated fault tree represents a failure behaviour of a system state of the multi-mode system.

11. The apparatus according to claim 10, wherein each component fault tree mode element of the plurality of component fault tree mode elements models an operating mode specific failure behaviour of a component of the system of the components.

* * * * *